US008919966B2

(12) United States Patent
Falendysz et al.

(10) Patent No.: US 8,919,966 B2
(45) Date of Patent: Dec. 30, 2014

(54) ROTATABLE MOUNTING SYSTEM FOR A PROJECTION SYSTEM

(75) Inventors: Greg Falendysz, Sun Prairie, WI (US); Allen H. Frater, Mequon, WI (US); William H. Jones, Menomonee Falls, WI (US); Cheryl Anderson, Belgium, WI (US)

(73) Assignee: Speranza, Inc., Milwaukee, WI (US)

( * ) Notice: Subject to any disclaimer, the term of this patent is extended or adjusted under 35 U.S.C. 154(b) by 997 days.

(21) Appl. No.: 12/361,984

(22) Filed: Jan. 29, 2009

(65) Prior Publication Data

US 2010/0188642 A1     Jul. 29, 2010

(51) Int. Cl.
*G03B 21/14*     (2006.01)

(52) U.S. Cl.
CPC ............. *G03B 21/14* (2013.01); *Y10S 248/919* (2013.01)
USPC .......... 353/79; 353/119; 248/125.8; 248/414; 248/919

(58) Field of Classification Search
CPC ....... F16M 11/10; F16M 11/04; F16M 11/22; F16M 11/24; F16M 11/02; F16M 11/42; F16M 11/28
USPC ....................... 353/79, 98, 99, 100, 101, 119; 248/125.8, 414, 919
See application file for complete search history.

(56) References Cited

U.S. PATENT DOCUMENTS

| | | | |
|---|---|---|---|
| 4,708,004 A * | 11/1987 | Allen | 70/226 |
| 4,728,065 A | 3/1988 | Coote | |
| 5,448,263 A | 9/1995 | Martin | |
| 6,179,426 B1 * | 1/2001 | Rodriguez et al. | 353/69 |
| 6,334,684 B1 | 1/2002 | Yoshida et al. | |
| 6,390,433 B1 * | 5/2002 | Kasa-Djukic | 248/441.1 |
| 6,394,609 B1 | 5/2002 | Rodriguez, Jr. et al. | |
| 6,394,610 B2 | 5/2002 | Rodriguez, Jr. | |
| 6,464,501 B1 | 10/2002 | Strohecker et al. | |
| 6,485,146 B2 | 11/2002 | Rodriguez, Jr. | |
| 6,498,590 B1 | 12/2002 | Dietz et al. | |

(Continued)

FOREIGN PATENT DOCUMENTS

WO     WO2004109489 A2     12/2004

OTHER PUBLICATIONS

Dietz, P, et al., "DiamondTouch: A Multi-User Touch Technology", Proceedings of the UIST 2001, 14th Annual ACM Symposium on User Interface Software and Technology, Nov. 11-14, 2001, Orlando, Florida, pp. 219-226.

(Continued)

*Primary Examiner* — Francis M Legasse, Jr.
*Assistant Examiner* — Bao-Luan Le
(74) *Attorney, Agent, or Firm* — Bell & Manning, LLC

(57) ABSTRACT

A rotatable projection system is provided. A mounting system for the projection system includes a support back and a rotatable mounting system mounted to the support back. The rotatable mounting system includes a first frame, a second frame mounted to the first frame in a fixed angular relationship, and a rotating joint mounted to at least one of the first frame and the second frame and to the support back to provide rotation of the rotatable mounting system relative to the support back. The rotatable projection system may further include a projector mounted to the first frame and a projection board mounted to the second frame. The projector may include a mirror positioned to reflect light from the projector onto the projection board.

18 Claims, 14 Drawing Sheets

(56) References Cited

U.S. PATENT DOCUMENTS

| | | | |
|---|---|---|---|
| 6,530,664 | B2 | 3/2003 | Vanderwerf et al. |
| 6,540,366 | B2 * | 4/2003 | Keenan et al. ............... 353/79 |
| 6,545,660 | B1 | 4/2003 | Shen et al. |
| 6,604,829 | B2 | 8/2003 | Rodriguez, Jr. |
| 6,747,636 | B2 | 6/2004 | Martin |
| 6,791,530 | B2 | 9/2004 | Vernier et al. |
| 6,803,906 | B1 | 10/2004 | Morrison et al. |
| 6,894,703 | B2 | 5/2005 | Vernier et al. |
| 6,929,371 | B2 | 8/2005 | Saito |
| 6,962,271 | B2 | 11/2005 | Gregson, Jr. |
| 6,992,822 | B2 | 1/2006 | Ma et al. |
| 7,242,394 | B2 | 7/2007 | Lahade et al. |
| 2002/0011544 | A1 * | 1/2002 | Bosson ...................... 248/121 |
| 2005/0183035 | A1 | 8/2005 | Ringel et al. |
| 2005/0263653 | A1 | 12/2005 | Brown, Jr. |
| 2008/0142667 | A1 * | 6/2008 | German et al. ............ 248/447.1 |

OTHER PUBLICATIONS

3M Innovation Brochure, "3M™ Digital Wall Display Plus Series," 2005, 2 pages.

"Your meeting just went digital . . . " PowerPoint presentation for 3M Digital Wall Display Plus Series, 2005, 31 pages.

"Products for Learning: Every Child Works Wonders, K-12," Smart Technologies catalog, printed Dec. 2005, 28 pages.

"Front projection," Smart Technologies, http://www2.smarttech.com/st/en-US/Products/SMART+Boards/Front+Projection/Features.htm, printed Jun. 2, 2006, 6 pages.

Non Final Office Action received in U.S. Appl. No. 11/611,660, Mar. 8, 2010, pp. 1-7.

Notice of Allowance received in U.S. Appl. No. 11/611,660, Jul. 14, 2010.

* cited by examiner

ROTATABLE MOUNTING SYSTEM FOR A PROJECTION SYSTEM

FIELD

The field of the disclosure relates generally to a rotatable projection system for mounting a projection board and a projector.

BACKGROUND

The use of electronic whiteboards is becoming more and more prevalent in corporate, factory, classroom, and other collaborative environments. An electronic whiteboard provides users with an interactive touch screen upon which a variety of actions can be performed. For example, electronic whiteboards are able to receive a projected image of a computer screen such that users can remotely control computer applications by touching the whiteboard. Electronic whiteboards can also allow users to annotate documents and web pages, take notes, save annotations and notes, give presentations, collaborate on-site or across a distance, etc.

In an educational environment, a whiteboard is an invaluable tool which can be used by students, teachers, and professors to enhance learning. A teacher can use the whiteboard to present notes, share information stored in computer applications, play video, browse the Internet, etc. Teachers can also have students walk up to the front of the class and interact with the whiteboard. In a typical classroom environment, the whiteboard is statically, vertically mounted on a classroom wall much in the same way as a traditional blackboard. A projector for projecting images onto the whiteboard is placed in front of and at some distance from the whiteboard. Unfortunately, this traditional projector/whiteboard arrangement inherently excludes a subset of students from interacting with the whiteboard and limits the overall effectiveness of the whiteboard.

For example, it can be difficult or impossible for a student that is disabled, in a wheelchair, or on crutches to interact with a whiteboard which is statically, vertically mounted on a wall. Traditional whiteboards cannot be lowered, tilted, or moved to accommodate such students. As a result, students of limited means are prevented from interacting with the rest of their classmates. Further, utilizing a single whiteboard in a manner similar to a blackboard allows only one or a few students in the classroom to interact with the whiteboard at a given time. In addition, the position of the projector makes it easy for lectures to be disrupted as images from the projector are blocked by the lecturer, passersby, student movements such as raising a hand, etc.

In a work environment, in addition to being used as a teaching and presenting tool, whiteboards are also used to facilitate collaboration among co-workers. A group of workers can gather around the whiteboard and utilize the touch screen to control computer applications, design products, edit documents, compose documents and presentations, etc. In a typical workplace, whiteboards are statically, vertically mounted to an office or board room wall. Similar to a classroom environment, a projector for projecting images onto the whiteboard is placed in front of and at some distance from the whiteboard. As with students, it can be difficult or impossible for workers of limited means to take advantage of whiteboards which are statically, vertically mounted. Further, mounted whiteboards are not portable in the sense that they can easily be moved from one room to another or from one plant to another. Such immobility is inconvenient and can force a company to purchase more whiteboards than it needs.

In addition, when a group of coworkers gathers around the whiteboard, images projected from the projector are often blocked. It can also be uncomfortable for a group of people to stand in front of a vertically mounted whiteboard for any length of time.

SUMMARY

In an exemplary embodiment, a rotatable projection system is provided. The system includes a support back and a rotatable mounting system mounted to the support back. The rotatable mounting system includes a first frame, a second frame mounted to the first frame in a fixed angular relationship, and a rotating joint mounted to at least one of the first frame and the second frame and to the support back to provide rotation of the rotatable mounting system relative to the support back.

Other principal features and advantages will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
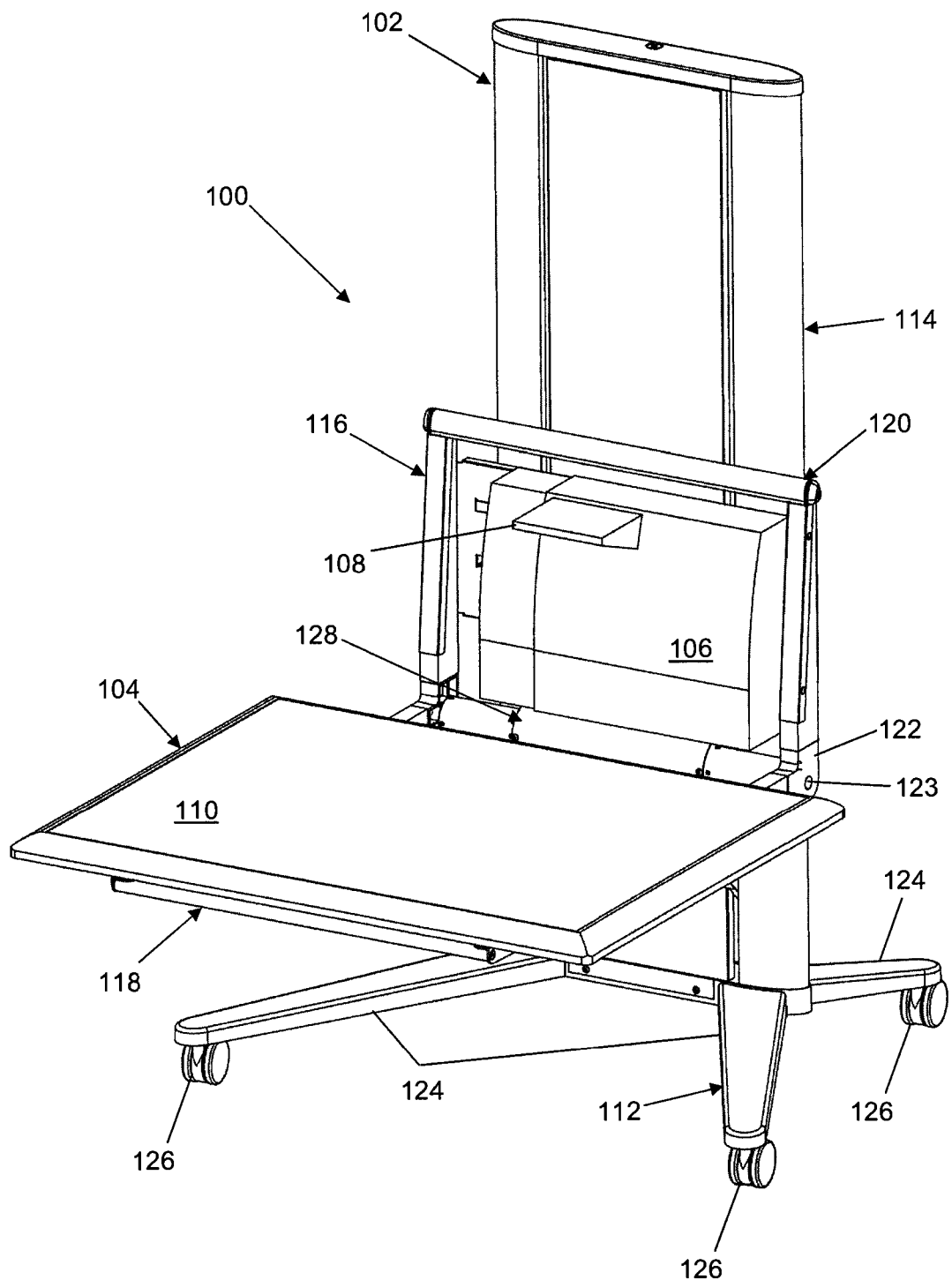
FIG. 1 is a front perspective view of a rotatable projection system with a projection surface in a horizontal position in accordance with an exemplary embodiment.

With reference to FIG. 1, a rotatable projection system 100 is shown in accordance with an exemplary embodiment. Rotatable projection system 100 may include a support stand 102, a projection board 104, a projector 106, and a rotatable mounting system 116. Projection board 104 includes a projection surface 110. In an exemplary embodiment, projection board 104 is a whiteboard including a touch sensitive projection surface. In an exemplary embodiment, projection board 104 is further a whiteboard such as those manufactured by SMART Technologies of Calgary, Alberta, Canada. In an exemplary embodiment, projector 106 includes a mirror housing 108 which houses a mirror (not shown). The mirror is arranged to reflect light from projector 106 onto projection surface 110.

In an exemplary embodiment, support stand 102 includes a base 112 and a support back 114 mounted to and extending up from base 112. As used herein, the term "mount" includes join, unite, connect, associate, insert, hang, hold, affix, attach, fasten, bind, paste, secure, bolt, screw, rivet, solder, weld, and other like terms. Rotatable mounting system 116 rotatably mounts to support back 114. In an exemplary embodiment, rotatable mounting system 116 also slidably mounts to support back 114.

Rotatable mounting system 116 may include a projection board mounting frame 118, a projector mounting frame 120, a joint 122, a shaft 123, and a positioning mechanism 128. Joint 122 connects projection board mounting system 118 to projector mounting frame 120 in a fixed angular relationship so that light from projector 106 is reflected onto projection surface 110. Shaft 123 extends through joint 122.

In an exemplary embodiment, base 112 includes a plurality of legs 124 to provide a stable platform for support back 114 and for rotatable mounting system 116. In an exemplary embodiment, a roller 126 is mounted to each of the plurality of legs 124 to provide a mobile support stand for rotatable mounting system 116. In another exemplary embodiment, support back 114 may be mounted to a fixed base such as a wall.

In the exemplary embodiment of FIG. 1, a front perspective view of rotatable mounting system 116 is shown with rotatable mounting system 116 positioned so that projection surface 110 is generally horizontal and projector 106 is generally vertical so that projection board mounting frame 118 and projector mounting frame 120 are mounted to form a 90 degree angle. However, angular relationships other than 90 degrees may be used depending on the reflection properties of projector 106 and/or mirror 108. In the exemplary embodiment of FIG. 1, rotatable mounting system 116 is shown positioned at a lower vertical point relative to base 112.

Figure 2:
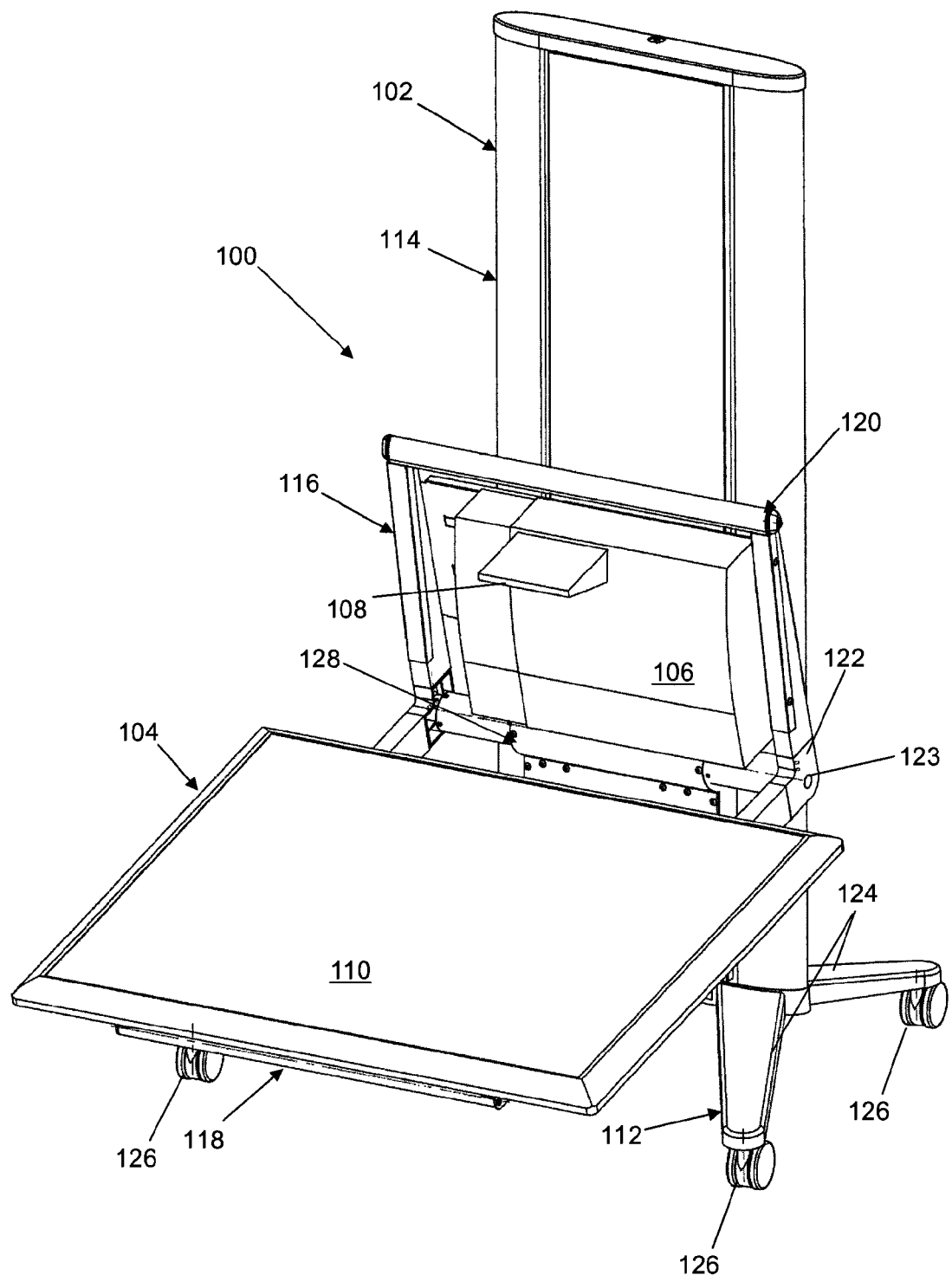
FIG. 2 is a front perspective view of the rotatable projection system of FIG. 1 with the projection surface rotated 15 degrees from the horizontal position in accordance with an exemplary embodiment.

With reference to FIG. 2, a front perspective view of rotatable mounting system 116 is shown with rotatable mounting system 116 rotated relative to the position of FIG. 1 so that projection surface 110 forms a 15 degree angle relative to horizontal and projector 106 forms a 15 degree angle relative to vertical so that projection board mounting frame 118 and projector mounting frame 120 are mounted to form a 90 degree angle, but rotated 15 degrees relative to support stand 102.

Figure 3:
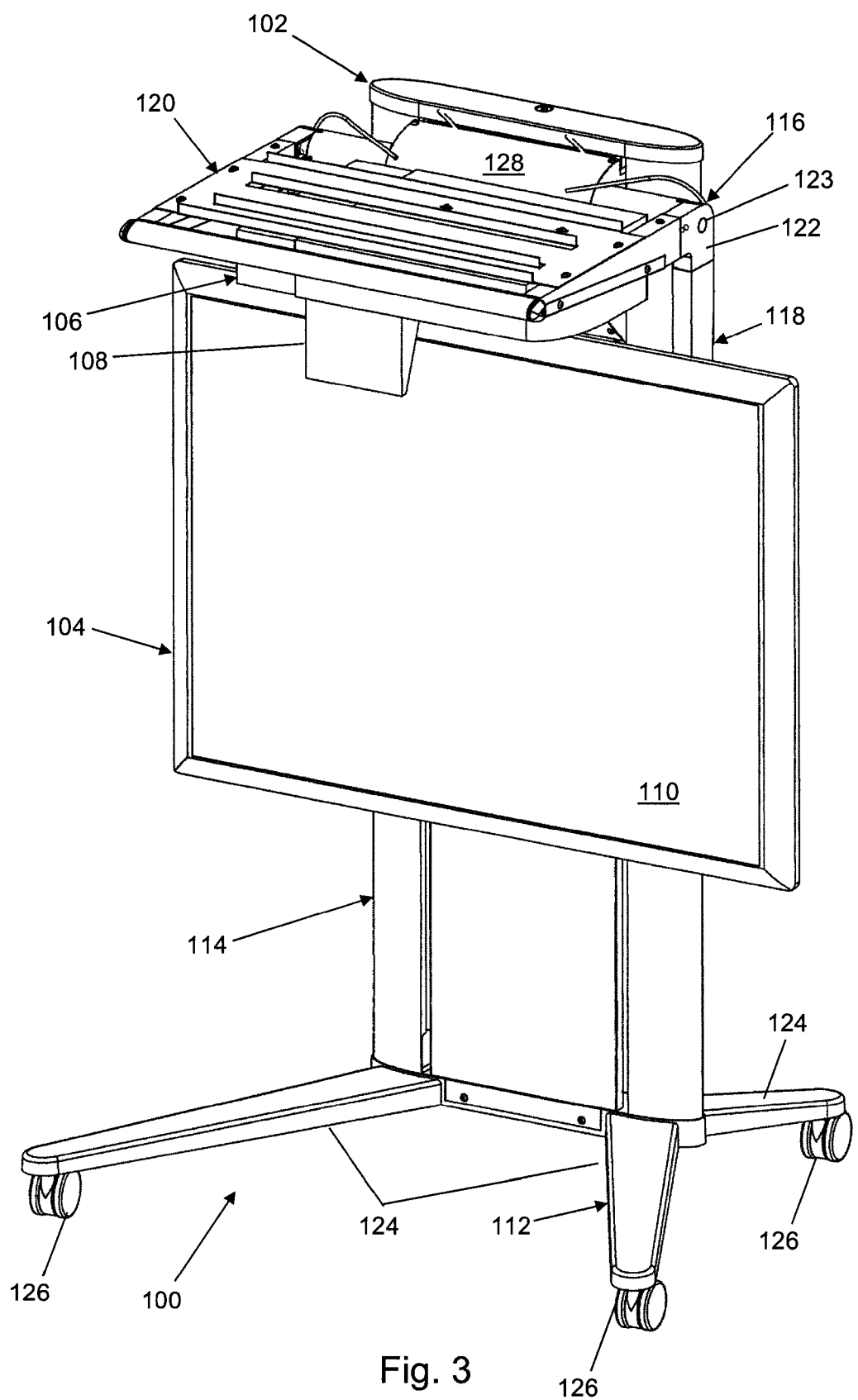
FIG. 3 is a front perspective view of the rotatable projection system of FIG. 1 with the projection surface rotated to a vertical position in accordance with an exemplary embodiment.

With reference to FIG. 3, a front perspective view of rotatable mounting system 116 is shown with rotatable mounting system rotated 90 degrees relative to the position of FIG. 1 so that projection surface 110 is generally vertical and projector 106 is generally horizontal so that projection board mounting frame 118 and projector mounting frame 120 are mounted to form a 90 degree angle, but rotated 90 degrees relative to support stand 102. Rotatable mounting system 116 may be rotated between a horizontal position (defined with reference to a position of projection surface 110) and a vertical position (defined with reference to a position of projection surface 110) using a positioning mechanism 128 (shown in more detail with reference to FIGS. 9 and 10).

In the exemplary embodiment of FIG. 3, rotatable mounting system 116 is shown positioned at an upper vertical point relative to base 112. Rotatable mounting system 116 may be moved between the lower vertical point relative to base 112 and the upper vertical point relative to base 112 using a height adjustment system (shown with reference to FIGS. 11 and 12). In various embodiments, rotatable mounting system 116 may be moved vertically in steps or continuously.

Figure 4:
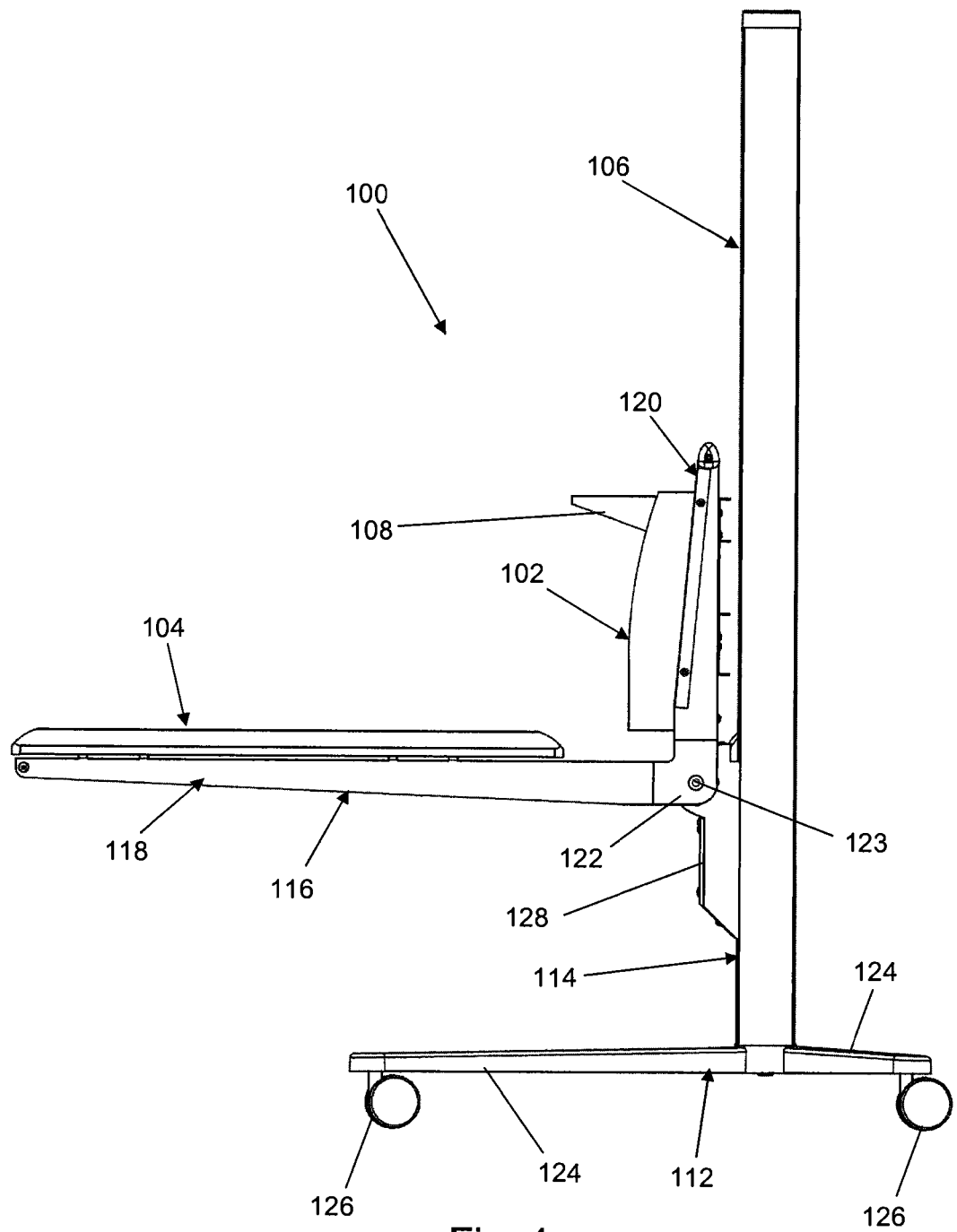
FIG. 4 is a side view of the rotatable projection system of FIG. 1 with the projection surface in the horizontal position in accordance with an exemplary embodiment.
Figure 5:
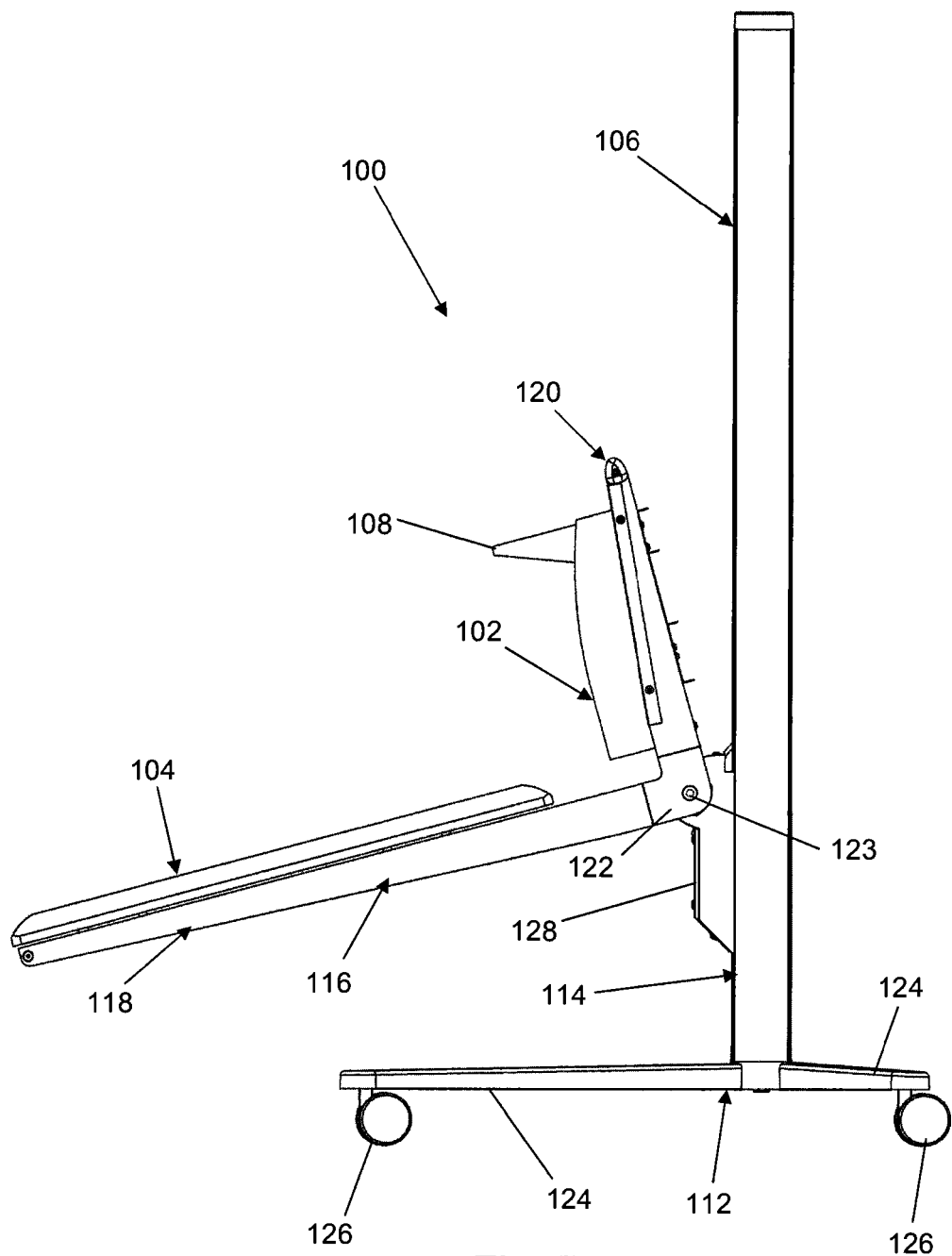
FIG. 5 is a side view of the rotatable projection system of FIG. 1 with the projection surface rotated 15 degrees from the horizontal position in accordance with an exemplary embodiment.
Figure 6:
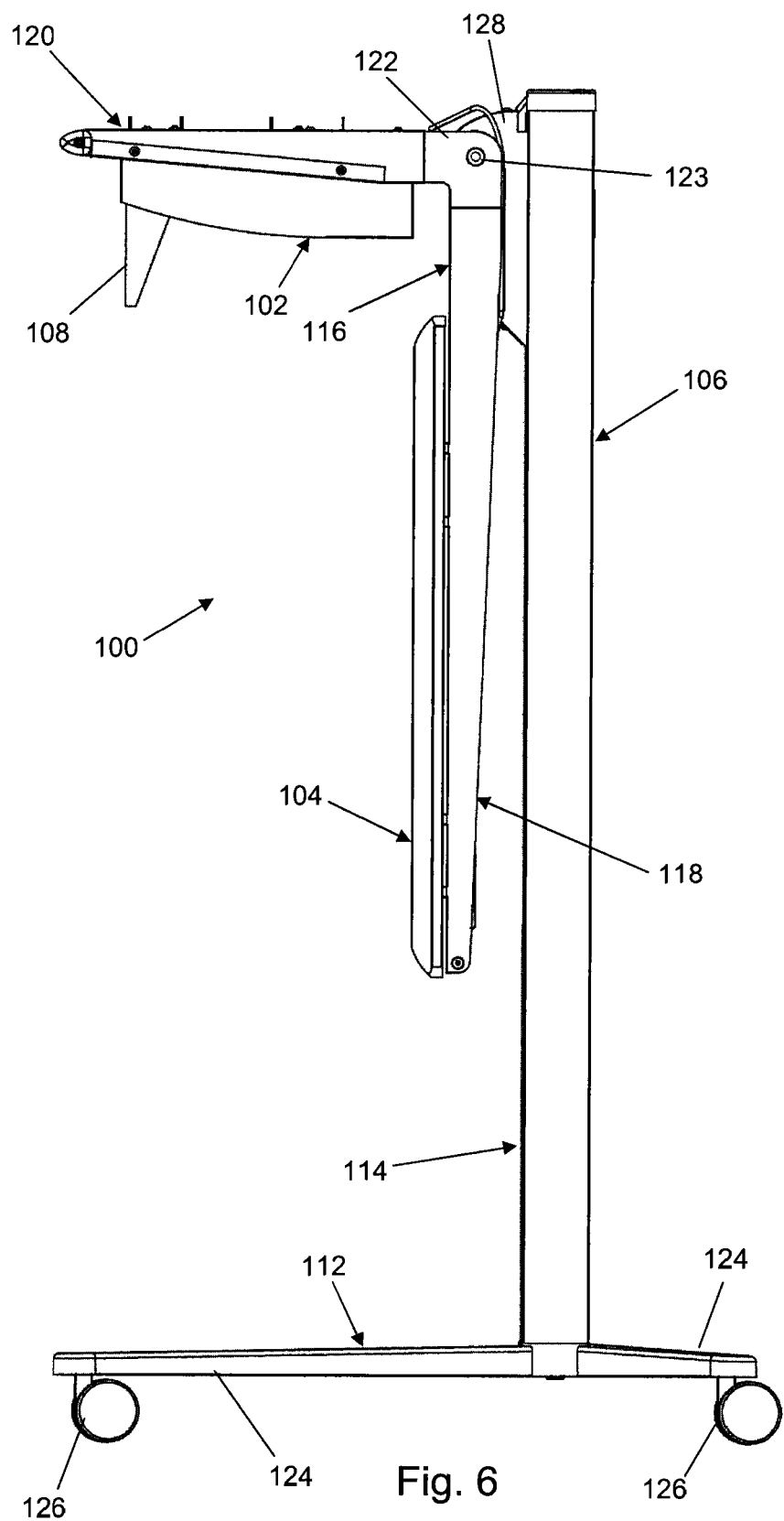
FIG. 6 is a side perspective view of the rotatable projection system of FIG. 1 with the projection surface rotated to the vertical position in accordance with an exemplary embodiment.

With reference to FIG. 4, a side view of rotatable mounting system 116 is shown with rotatable mounting system 116 positioned as in FIG. 1. With reference to FIG. 5, a side view of rotatable mounting system 116 is shown with rotatable mounting system 116 positioned as in FIG. 2. With reference to FIG. 6, a side view of rotatable mounting system 116 is shown with rotatable mounting system 116 positioned as in FIG. 3.

Figure 7:
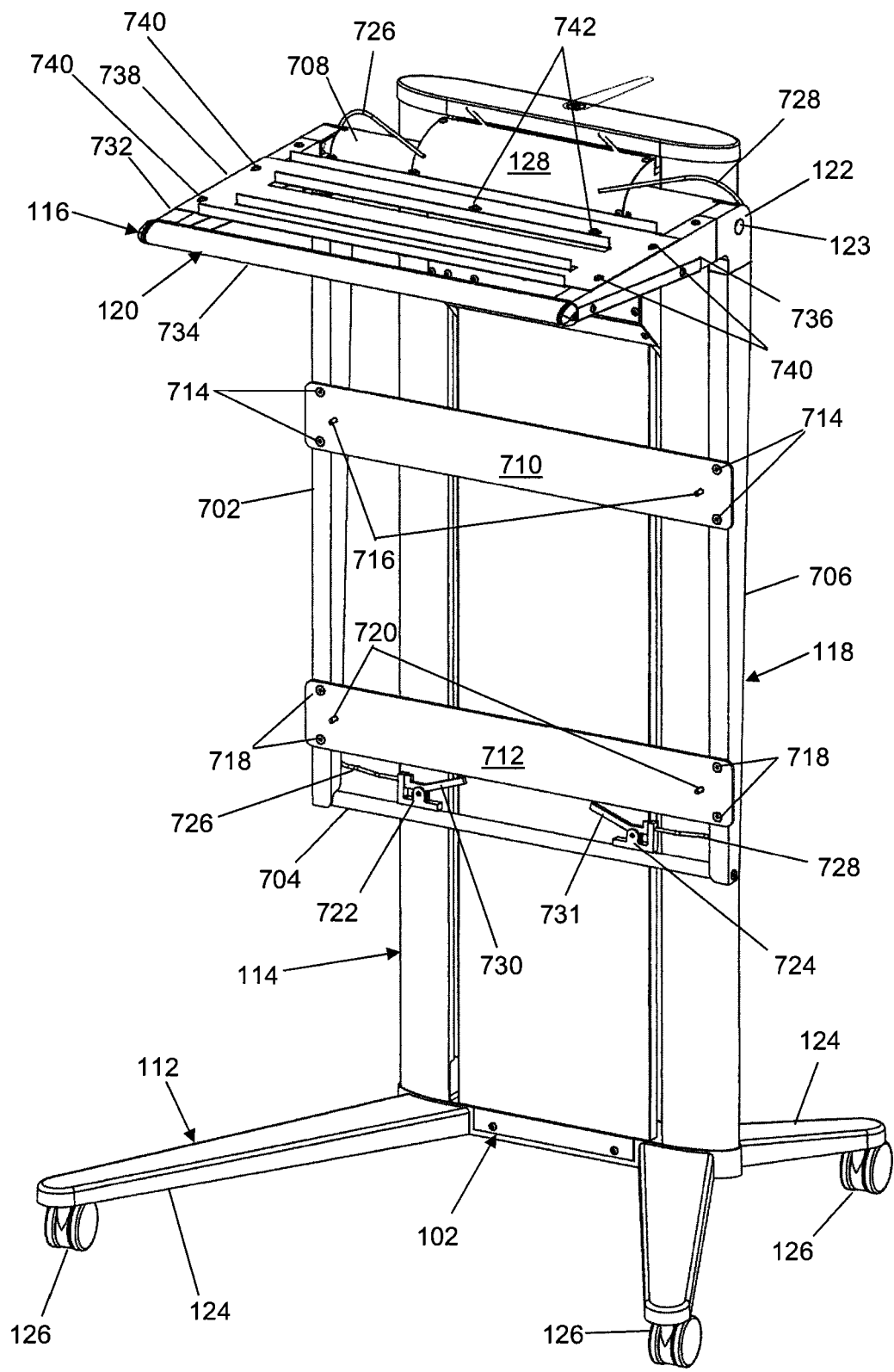
FIG. 7 is a front perspective view of a support stand of the rotatable projection system rotated to the position of FIG. 3 in accordance with an exemplary embodiment.
Figure 8:
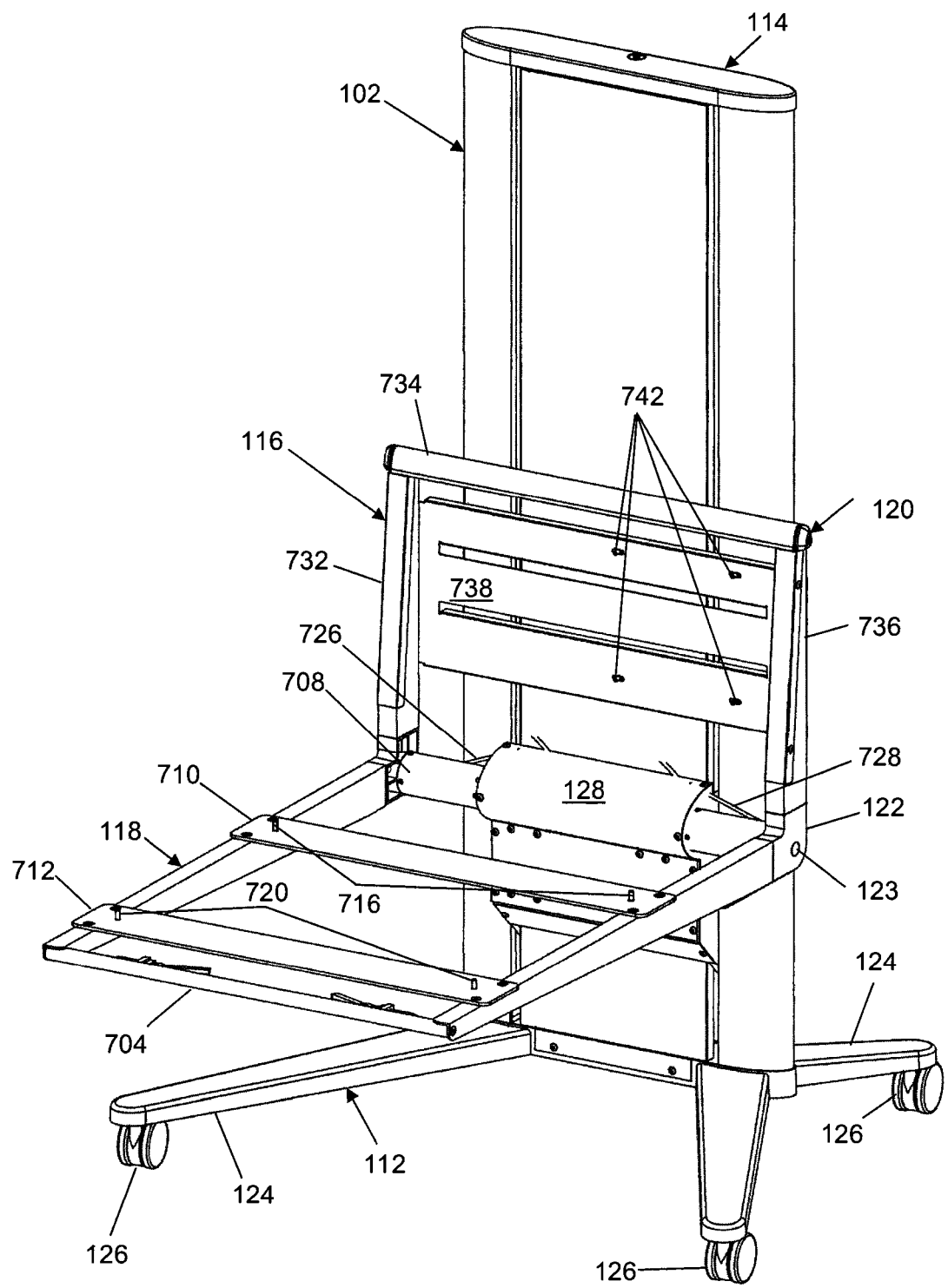
FIG. 8 is a front perspective view of the support stand of the rotatable projection system rotated to the position of FIG. 1 in accordance with an exemplary embodiment.

With reference to FIG. 7, rotatable mounting system 116 is shown without projection board 104 and projector 106 and in the position of FIGS. 3 and 6. With reference to FIG. 8, rotatable mounting system 116 is shown without projection board 104 and projector 106 and in the position of FIGS. 1 and 4. In the exemplary embodiment of FIGS. 7 and 8, projection board mounting frame 118 may include a first arm 702, a second arm 704, a third arm 706, a fourth arm 708, a first projection board brace 710, and a second projection board brace 712. First arm 702, second arm 704, third arm 706, and fourth arm 708 are mounted to each other to form a generally rectangular frame to support projection board 104. For example, second arm 704 extends between first arm 702 and third arm 706 at a first end of first arm 702 and of third arm 706. Fourth arm 708 extends between first arm 702 and third arm 706 at a second end of first arm 702 and of third arm 706. First projection board brace 710 is mounted between first arm 702 and third arm 706 using first connectors 714. Second projection board brace 712 is mounted between first arm 702 and third arm 706 using second connectors 718. First projection board brace 710 and second projection board brace 712 provide additional stability for projection board mounting frame 118. First projection board connectors 716 and second projection board connectors 720 may be used to mount projection board 104 to projection board mounting frame 118. In the exemplary embodiment of FIGS. 7 and 8, first projection board connectors 716 extend from first projection board brace 710, and second projection board connectors 720 extend from second projection board brace 712 though other locations may be used.

In general, projection board mounting frame 118 is sized and shaped based on the size, weight, and/or shape of projection board 104. Projection board mounting frame 118 may be configured to have a variety of shapes and sizes sufficient to support projection board 104. Any material(s) capable of supporting projection board 104 may be used to form projection board mounting frame 118. A fewer or a greater number of arms, braces, and connectors may be used in different exemplary embodiments to support projection board 104.

Rotatable mounting system 116 may further include a first brake release lever 722, a second brake release lever 724, a first cable 726, and a second cable 728. In the exemplary embodiment of FIGS. 7 and 8, first brake release lever 722 and second brake release lever 724 mount to second arm 704 of projection board mounting frame 118 though first brake release lever 722 and second brake release lever 724 may be mounted at any accessible location on rotatable mounting system 116.

Figure 9:
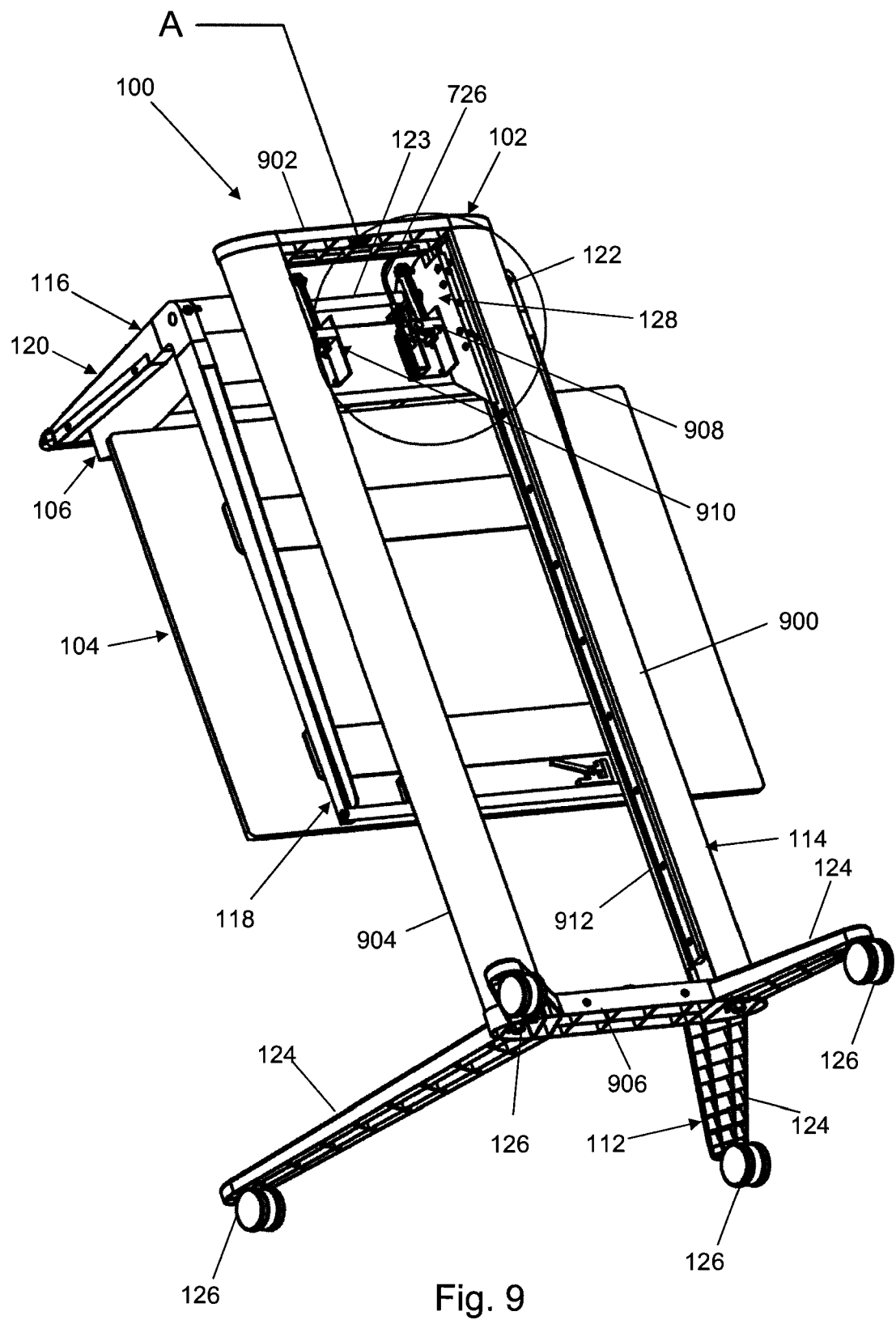
FIG. 9 is a first back perspective view of the rotatable projection system rotated to the position of FIG. 3 in accordance with an exemplary embodiment.
Figure 10:
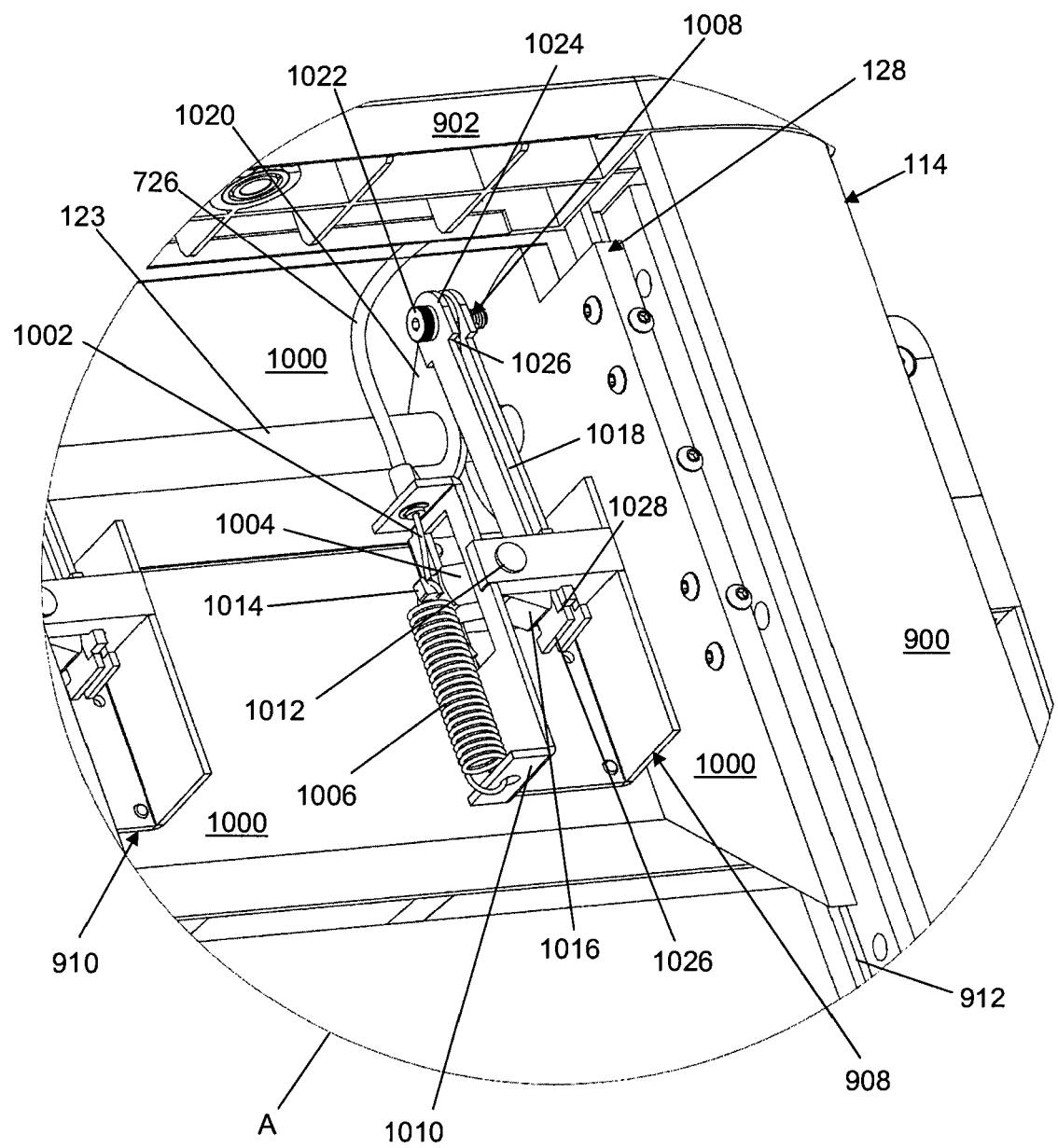
FIG. 10 is a back perspective view of a rotation mechanism of a rotatable mounting system of the rotatable projection system rotated to the position of FIG. 3 in accordance with an exemplary embodiment.

First cable 726 includes a first end that mounts to first brake release lever 722 and a second end that mounts to positioning mechanism 128 (shown in more detail with reference to FIGS. 9 and 10). Second cable 728 includes a first end that mounts to second brake release lever 724 and a second end that mounts to positioning mechanism 128. First brake release lever 722 includes a first lever 730 that when depressed moves first cable 726 away from positioning mechanism 128. Second brake release lever 724 includes a second lever 731 that when depressed moves second cable 728 away from positioning mechanism 128. Depression of first lever 730 and second lever 731 releases a locking mechanism through pulling of first cable 726 and of second cable 728, respectively, to allow rotation of rotatable mounting system 116 relative to support stand 102. A fewer or a greater number of brake release levers and cables may be used in different exemplary embodiments.

In the exemplary embodiment of FIGS. 7 and 8, projector mounting frame 120 may include a first arm 732, a second arm 734, a third arm 736, fourth arm 708, and a projector brace 738. First arm 732, second arm 734, third arm 736, and fourth arm 708 are mounted to each other to form a generally rectangular frame to support projector 106. For example, second arm 734 extends between first arm 732 and third arm 736 at a first end of first arm 732 and third arm 736, and fourth arm 708 extends between first arm 732 and third arm 736 at a second end of first arm 732 and third arm 736. Projector brace 738 is mounted between first arm 732 and third arm 736 using first connectors 740. Projector brace 738 provides additional stability for projector mounting frame 120. Projector connectors 742 may be used to mount projector 106 to projector mounting frame 120. In the exemplary embodiment of FIGS. 7 and 8, projector connectors 742 extend from projector brace 738 though other location may be used.

In general, projector mounting frame 120 is sized and shaped based on the size, weight, and/or shape of projector 106. Projector mounting frame 120 may be configured to have a variety of shapes and sizes sufficient to support projector 106. Any material(s) capable of supporting projector 106 may be used to form projector mounting frame 120. A fewer or a greater number of arms, braces, and connectors may be used in different exemplary embodiments to support projector 106.

With reference to FIG. 9, a first back perspective view of rotatable projection system 100 is shown with rotatable mounting system 116 shown in the position of FIGS. 3 and 6. Some parts of rotatable projection system 100 have been removed for clarity. Support back 114 may include a first brace 900, a second brace 902, and a third brace 904, and base 112 may include a fourth brace 906. First brace 900, second brace 902, third brace 904, and fourth brace 906 are mounted to each other to form a generally rectangular frame to support rotatable mounting system 116. For example, second brace 902 extends between first brace 900 and third brace 904 at a first end of first brace 900 and of third brace 904. Fourth brace 906 extends between first brace 900 and third brace 904 at a second end of first brace 900 and of third brace 904. The plurality of legs 124 extend from fourth brace 906.

In the exemplary embodiment of FIG. 9, positioning mechanism 128 includes a first locking mechanism 908 and a second locking mechanism 910. First cable 726 mounts to first locking mechanism 908 and second cable 728 (not shown in FIG. 9) mounts to second locking mechanism 910. In the exemplary embodiment of FIG. 9, positioning mechanism 128 is slidably mounted between first brace 900 and third brace 904 in a first track 912 in an inside edge of first brace 900 and a second track (not shown) in an inside edge of third brace 904. A fewer or a greater number of braces may be used in different exemplary embodiments to support rotatable mounting system 116.

With reference to FIG. 10, a back perspective view of first locking mechanism 908 is shown as a cutaway section A from FIG. 9 with some parts not shown for clarity. Positioning mechanism 128 includes a support housing 1000 which at least partially covers first locking mechanism 908 and second locking mechanism 910 and mounts first locking mechanism 908 and second locking mechanism 910 to support stand 102. Support housing 1000 is slidably mounted in first track 912 and the second track.

First locking mechanism 908 includes a cable connector 1002, a locking pall 1004, a biasing mechanism 1006, a rotating joint 1008, and a support structure 1010. Support structure 1010 is mounted to support housing 1000. Cable connector 1002 is mounted to support structure 1010. Cable connector 1002 mounts cable 726 to locking pall 1004. Biasing mechanism 1006 mounts at a first end to support structure 1010 and at a second end to locking pall 1004. Locking pall 1004 mounts to support structure 1010 at a pivot pin 1012 and is configured to pivot about pivot pin 1012. Locking pall 1004 includes a first end 1014 and a second end 1016. At first end 1014, locking pall 1004 is mounted to biasing mechanism 1006 and cable connector 1002. In an exemplary embodiment, biasing mechanism 1004 is a tension spring.

Rotating joint 1008 includes a tension arm 1018, a cam 1020, and a mounting pin 1022. Mounting pin 1022 joins a first end 1024 of tension arm 1018 to cam 1020. Shaft 123 is mounted to and extends through cam 1020 and support housing 1000. At second end 1016, locking pall 1004 abuts tension arm 1018. When first lever 730 is depressed first brake release lever 722 pulls first cable 726 away from support structure 1010 causing locking pall 1004 to pivot about pivot pin 1012 so that second end 1016 of locking pall 1004 releases tension arm 1018 allowing tension arm 1018 to slide in a vertical direction rotating cam 1020 and shaft 123 and thereby rotating rotatable mounting system 116.

Tension arm 1018 includes a first stop 1026 and a second stop 1028. In an exemplary embodiment, first stop 1026 and second stop 1028 are formed as opposite ends of a groove in tension arm 1018. When second end 1016 of locking pall 1004 abuts first stop 1026, rotatable mounting system 116 is in the position indicated in FIGS. 1 and 4. When second end 1016 of locking pall 1004 abuts second stop 1028, rotatable mounting system 116 is in the position indicated in FIGS. 3 and 6. When second end 1016 of locking pall 1004 abuts tension arm 1018 between first stop 1026 and second stop 1028, rotatable mounting system 116 is in a position between the position indicated in FIGS. 1 and 4 and the position indicated FIGS. 3 and 6. For example, rotatable mounting system 116 may be rotated to the position indicated in FIGS.

2 and 5. Other rotating mechanisms may be used to provide rotation of rotatable mounting system 116 relative to support stand 102.

Figure 11:
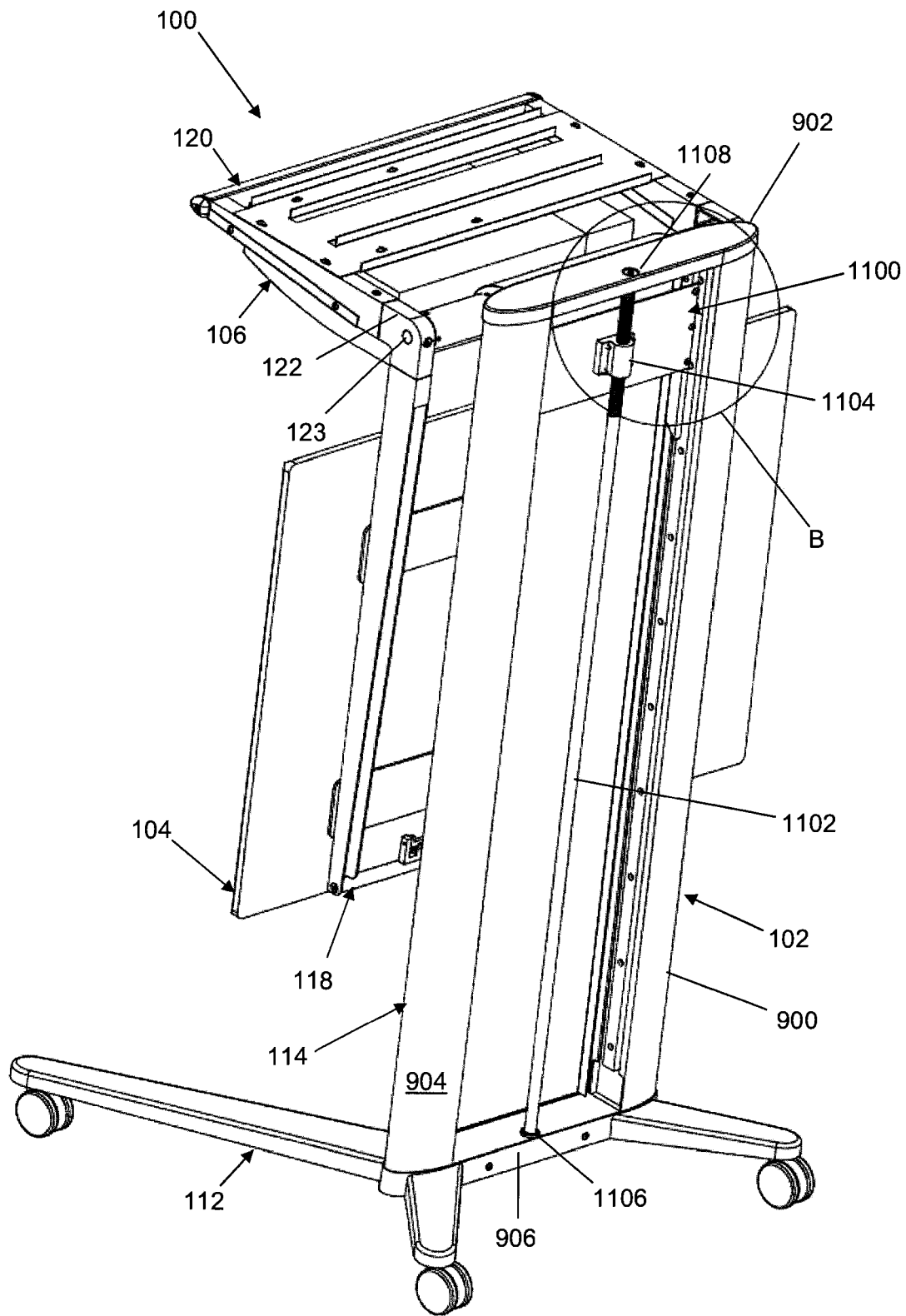
FIG. 11 is a second back perspective view of the rotatable projection system rotated to the position of FIG. 3 in accordance with an exemplary embodiment.

With reference to FIG. 11, a second back perspective view of rotatable projection system 100 is shown with rotatable mounting system 116 shown in the position of FIGS. 3 and 6. Some parts of rotatable projection system 100 have been removed for clarity. Rotatable projection system 100 further may include a height adjustment system 1100. Height adjustment system 1100 may include a height adjustment rod 1102 and a height adjustment bracket 1104. Height adjustment rod 1102 mounts to fourth brace 906 of base 112 of support stand 102 at a first orifice 1106. Height adjustment rod 1102 mounts to second brace 902 of support back 114 of support stand 102 at a second orifice 1108.

Figure 12:
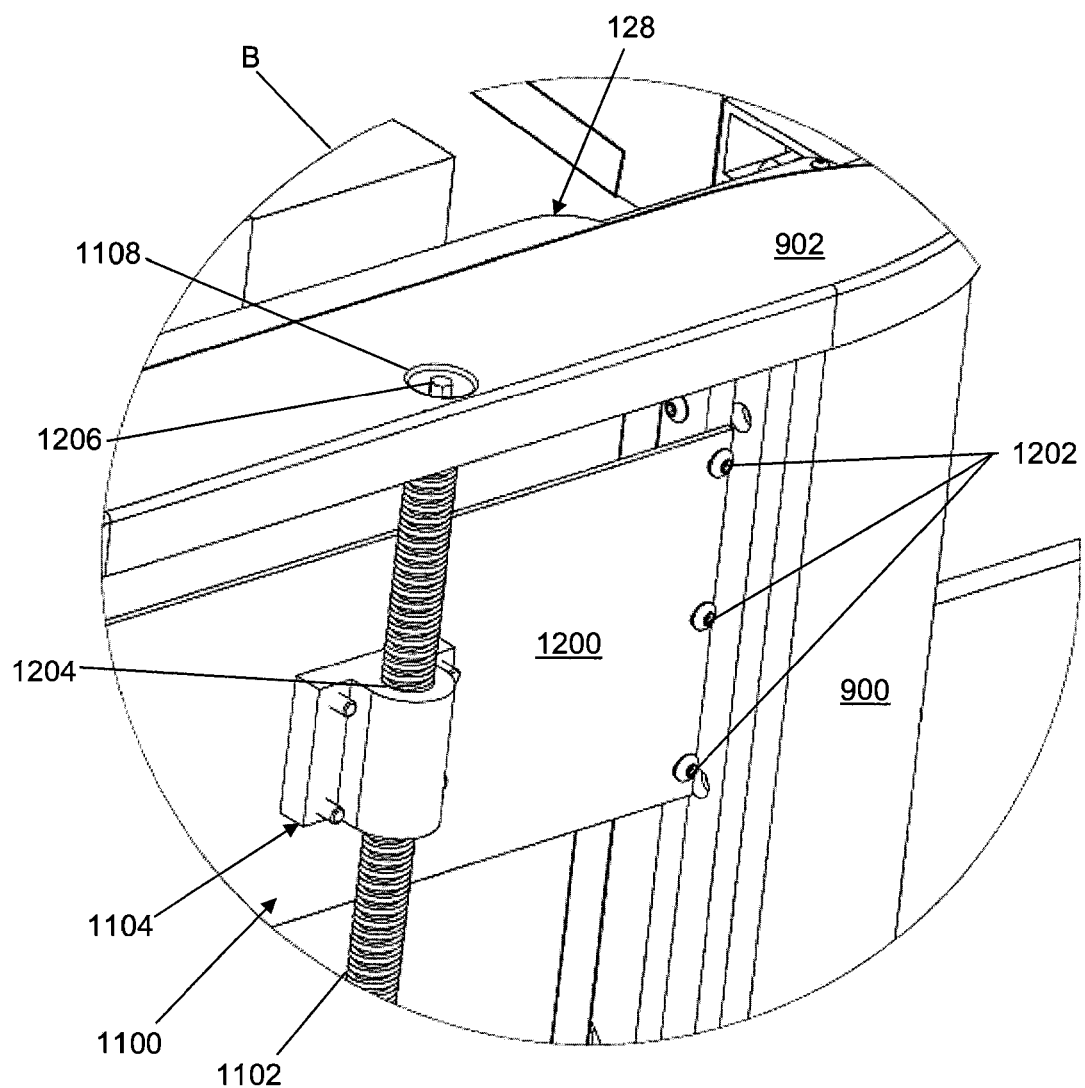
FIG. 12 is a back perspective view of a height adjustment mechanism of the rotatable mounting system of the rotatable projection system rotated to the position of FIG. 3 in accordance with an exemplary embodiment.

With reference to FIG. 12, a back perspective view of height adjustment system 1100 is shown as a cutaway section B from FIG. 11. Height adjustment bracket 1104 mounts to a plate 1200 which mounts to rotatable mounting system 116 using connectors 1202. Height adjustment bracket 1104 includes an orifice 1204 through which height adjustment rod 1102 extends. In an exemplary embodiment, height adjustment rod 1102 is threaded and orifice 1204 includes a complementary thread such that, when a nut 1206 mounted to height adjustment rod 1102 is rotated, height adjustment bracket 1104 moves in a vertical direction relative to support stand 102 thereby adjusting a height of rotatable mounting system 116. Other height adjustment systems may be used to provide translation of rotatable mounting system 116 relative to support stand 102. For example, height adjustment rod 1102 may be mounted to rotatable mounting system 116 and height adjustment bracket 1104 may be mounted to support stand 102.

Figure 13:
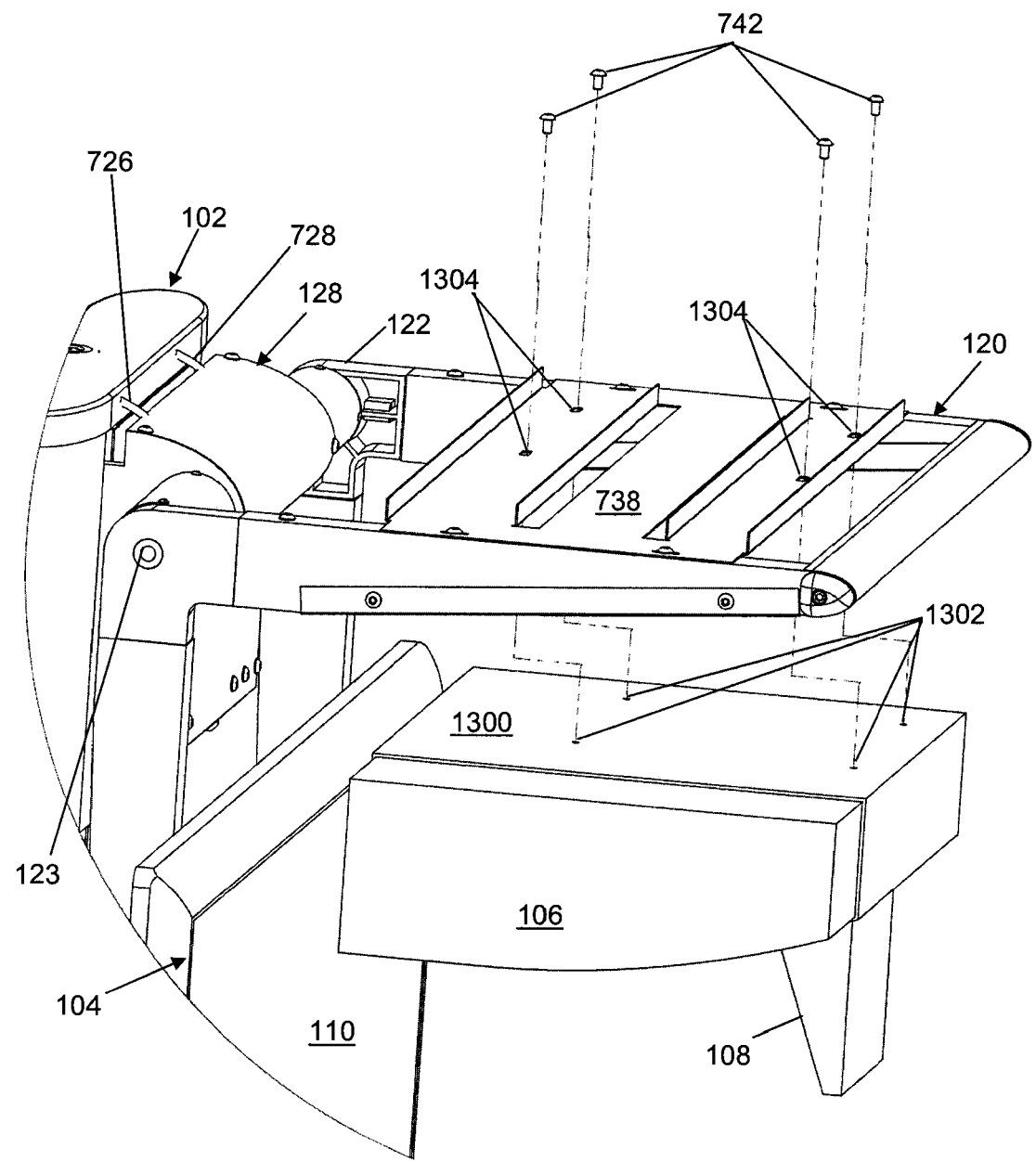
FIG. 13 is a side perspective view of a projector mounting frame of the rotatable projection system rotated to the position of FIG. 3 in accordance with an exemplary embodiment.

With reference to FIG. 13, a side perspective view of projector mounting frame 120 is shown rotated to the position of FIG. 3 in accordance with an exemplary embodiment. Projector 106 includes a projector back 1300 which includes a first plurality of orifices 1302. Projector brace 738 includes a second plurality of orifices 1304 through which projector connectors 742 extend. Projector connectors 742 further extend into the first plurality of orifices 1302 to mount projector 106 to projector mounting frame 120.

Figure 14:
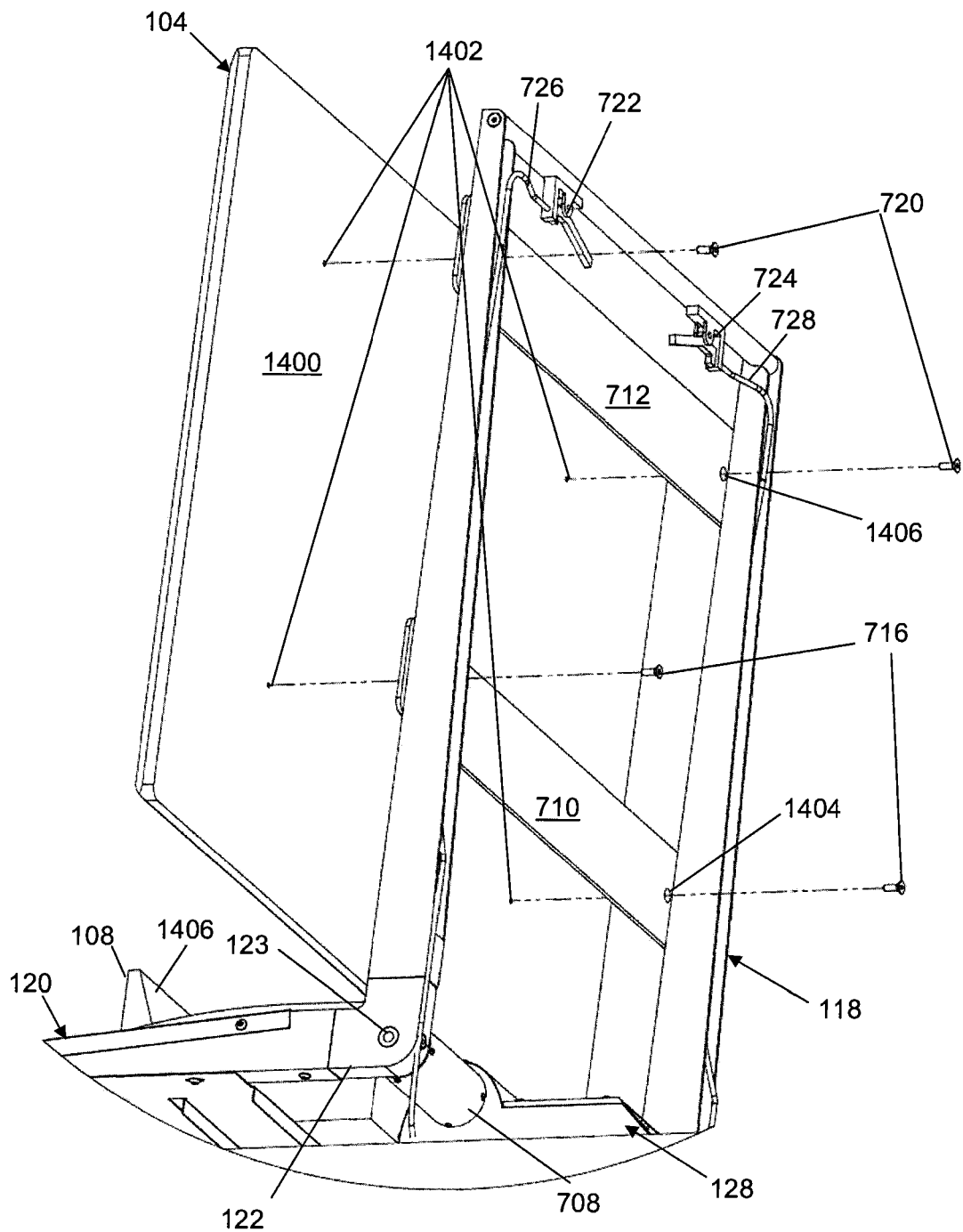
FIG. 14 is a bottom perspective view of a projection board mounting frame of the rotatable projection system rotated to the position of FIG. 1 in accordance with an exemplary embodiment.

With reference to FIG. 14, a bottom perspective view of projection board mounting frame 118 is shown rotated to the position of FIG. 1 in accordance with an exemplary embodiment. Projection board 104 includes a projection board back 1400 which includes a third plurality of orifices 1402. First projection board brace 710 includes a fourth plurality of orifices 1404 (a single orifice 1404 is shown) through which first projection board connectors 716 extend. First projection board connectors 716 further extend into the third plurality of orifices 1402 to mount projection board 104 to projection board mounting frame 118. Second projection board brace 712 includes a fifth plurality of orifices 1406 (a single orifice 1406 is shown) through which second projection board connectors 720 extend. Second projection board connectors 720 further extend into the third plurality of orifices 1402 to mount projection board 104 to projection board mounting frame 118.

Actuators may be used to control translation and/or rotational movement of movement of one or more components of rotatable mounting system 116. Exemplary actuators include an electric motor, a servo, stepper, or piezo motor, a pneumatic actuator, a gas motor, or the like.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more".

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device comprising:
a support back;
a rotatable mounting system comprising
a first frame configured to support a projector;
a second frame configured to support a projection board, wherein the projection board defines a projection plane; and
a joint mounting the first frame to the second frame in a fixed angular relationship; and
a positioning mechanism mounted between the support back and the rotatable mounting system, the positioning mechanism comprising
a rotating joint configured to provide rotation of the first frame and the second frame together; and
a height joint configured to provide translation of the rotating joint in a first direction, wherein the rotating joint provides the rotation of the projection plane from approximately parallel to the first direction to approximately perpendicular to the first direction.

2. The device of claim 1, further comprising a projector mounted to the first frame.

3. The device of claim 2, further comprising a projection board mounted to the second frame.

4. The device of claim 3, wherein the projection board includes a touch sensitive projection surface.

5. The device of claim 3, wherein the projector includes a mirror mounted to the projector to reflect light from the projector onto the projection board.

6. The device of claim 1, wherein the height adjustment system comprises a height adjustment bracket and a height adjustment rod mounted to the height adjustment bracket, wherein the height adjustment bracket and the height adjustment rod are configured to move relative to each other thereby providing translation of the rotating joint.

7. The device of claim 6, wherein the height adjustment rod is mounted to the support back and the height adjustment bracket is mounted to the rotatable mounting system.

8. The device of claim 6, wherein the height adjustment rod is threaded.

9. The device of claim 8, wherein the height adjustment rod comprises a nut at a first end of the height adjustment rod configured for rotation to cause linear actuation between the height adjustment bracket and the height adjustment rod.

10. The device of claim 8, wherein the height adjustment bracket comprises a threaded orifice and the height adjustment rod is inserted in the threaded orifice.

11. The device of claim 1, further comprising:
a shaft mounted to the rotating joint;
a release lever mounted to the rotatable mounting system;

a cable having a first end and a second end wherein the first end is mounted to the release lever; and a locking pall mounted to the second end of the cable;

wherein the rotating joint is configured for movement relative to the locking pall when the release lever moves the cable to release the locking pall allowing rotation of the first frame and the second frame together.

12. The device of claim 11, wherein the rotating joint comprises a cam mounted to the shaft and a first arm mounted to the cam, wherein the locking pall is configured to engage the first arm.

13. The device of claim 12, further comprising a spring mounted to the locking pall to bias the locking pall against the first arm.

14. The device of claim 11, wherein the shaft extends through the joint.

15. The device of claim 11, wherein the release lever is mounted to the second frame.

16. The device of claim 15, wherein the cable extends at least partially along an edge of the first frame.

17. The device of claim 1, wherein the rotating joint is slidably mounted to the support back.

18. The device of claim 1, wherein the support back is mounted on a base including a roller.

* * * * *

UNITED STATES PATENT AND TRADEMARK OFFICE
CERTIFICATE OF CORRECTION

| | | |
|---|---|---|
| PATENT NO. | : 8,919,966 B2 | Page 1 of 1 |
| APPLICATION NO. | : 12/361984 | |
| DATED | : December 30, 2014 | |
| INVENTOR(S) | : Greg Falendysz et al. | |

It is certified that error appears in the above-identified patent and that said Letters Patent is hereby corrected as shown below:

IN THE CLAIMS

Col. 8, Line 33 (Claim 1)

Delete "height joint" and replace with --height adjustment system--

Col. 8, Line 38 (Claim 2)

Delete "a projector" and replace with --the projector--

Col. 8, Line 40 (Claim 3)

Delete "a projection" and replace with --the projection--

Col. 9, Line 6 (Claim 11)

Delete "pall allowing rotation" and replace with --pall thereby allowing the rotation--

Col. 9, Line 20 (Claim 16)

Delete "first frame" and replace with --second frame--

Signed and Sealed this
Twelfth Day of January, 2016

Michelle K. Lee
*Director of the United States Patent and Trademark Office*